(12) United States Patent
Buzzi

(10) Patent No.: US 11,339,715 B2
(45) Date of Patent: May 24, 2022

(54) TURBOCHARGER ASSEMBLY

(71) Applicant: FB DESIGN S.R.L., Annone Brianza (IT)

(72) Inventor: Fabio Buzzi

(73) Assignee: FB DESIGN S.R.L., Annone Brianza (IT)

( * ) Notice: Subject to any disclaimer, the term of this patent is extended or adjusted under 35 U.S.C. 154(b) by 0 days.

(21) Appl. No.: 17/256,030

(22) PCT Filed: Sep. 27, 2019

(86) PCT No.: PCT/IB2019/058218
§ 371 (c)(1),
(2) Date: Dec. 24, 2020

(87) PCT Pub. No.: WO2020/065600
PCT Pub. Date: Apr. 2, 2020

(65) Prior Publication Data
US 2021/0123382 A1    Apr. 29, 2021

(30) Foreign Application Priority Data

Sep. 28, 2018  (IT) .................. 102018000009001

(51) Int. Cl.
*F02C 6/12*    (2006.01)
*F02B 37/00*   (2006.01)
(Continued)

(52) U.S. Cl.
CPC .............. *F02C 6/12* (2013.01); *F02B 37/00* (2013.01); *F01N 13/10* (2013.01);
(Continued)

(58) Field of Classification Search
CPC ...... F01D 17/148; F01D 21/14; F01N 13/085; F01N 13/10; F01N 13/1805;
(Continued)

(56) References Cited

U.S. PATENT DOCUMENTS 4,638,634 A * 1/1987 McLean ................ F02B 37/164
60/602
5,079,921 A * 1/1992 McCandless .......... F02B 37/22
60/602
(Continued)

FOREIGN PATENT DOCUMENTS

CN    103174470 A    6/2013
CN    108317004 A    7/2018
(Continued)

OTHER PUBLICATIONS

International Search Report and Written Opinion dated Nov. 15, 2019 in PCT/IB2019/058218, 13 pages.
(Continued)

*Primary Examiner* — Jesse S Bogue
(74) *Attorney, Agent, or Firm* — Element IP, PLC

(57) ABSTRACT

The present invention relates to an improved turbocharger assembly, particularly of the variable geometry type. The improved turbocharge assembly contains a turbine. The turbine includes an impeller housed in a casing, a flange that can be sealingly associated with a corresponding flange of an exhaust gas manifold of an engine, and a clapet valve that contains a shutter element and a housing seat. The housing seat is fashioned in a frame made in one piece with the casing.

11 Claims, 5 Drawing Sheets

(51) Int. Cl.
*F01N 13/10* (2010.01)
*F01N 13/18* (2010.01)
*F02B 39/00* (2006.01)

(52) U.S. Cl.
CPC ...... *F01N 13/1827* (2013.01); *F01N 2590/02* (2013.01); *F02B 39/005* (2013.01); *F05D 2220/40* (2013.01)

(58) Field of Classification Search
CPC ............ F01N 13/1827; F01N 13/1855; F01N 2240/36; F01N 2260/26; F01N 2450/24; F01N 2590/02; F01N 5/04; F02B 37/00; F02B 39/005; F02B 39/16; F02C 6/12; F05D 2220/40; F05D 2270/096; Y02T 10/12
See application file for complete search history.

(56) References Cited

U.S. PATENT DOCUMENTS

| | | | |
|---|---|---|---|
| 5,591,058 A | 1/1997 | Schriever et al. | |
| 6,092,371 A * | 7/2000 | Feucht | F02B 37/22 60/602 |
| 7,806,110 B1 | 10/2010 | Broman et al. | |
| 8,424,304 B2 * | 4/2013 | Serres | F01D 9/026 60/602 |
| 8,991,174 B2 * | 3/2015 | Boning | F16K 1/222 60/605.1 |
| 9,163,556 B2 * | 10/2015 | Micanek | F02B 37/183 |
| 9,273,594 B2 * | 3/2016 | Bandyopadhyay | F02D 19/0689 |
| 9,670,823 B2 * | 6/2017 | Hayman | F02F 1/36 |
| 9,702,266 B2 * | 7/2017 | Celaya | F01D 25/28 |
| 9,752,457 B2 * | 9/2017 | Hiller | F01D 17/105 |
| 9,982,591 B2 * | 5/2018 | Nishioka | F02B 37/025 |
| 10,060,536 B2 * | 8/2018 | Cizek | F02B 39/00 |
| 10,414,449 B2 * | 9/2019 | Elogab | B62D 35/00 |
| 2003/0015182 A1 | 1/2003 | Gokan et al. | |
| 2007/0089413 A1 * | 4/2007 | Green | F01N 3/18 60/605.1 |
| 2007/0199313 A1 | 8/2007 | Kumasaka et al. | |
| 2009/0014674 A1 * | 1/2009 | Grissom | F16K 11/052 251/298 |
| 2011/0179770 A1 * | 7/2011 | Schmuck-Soldan | F02B 37/18 60/299 |
| 2016/0223085 A1 * | 8/2016 | Yamazaki | F16J 15/0818 |
| 2017/0175564 A1 * | 6/2017 | Schlak | F01D 15/10 |
| 2020/0325812 A1 * | 10/2020 | Arminjon | F01N 13/10 |

FOREIGN PATENT DOCUMENTS

| | | |
|---|---|---|
| DE | 1960702 A1 | 6/1971 |
| FR | 2404748 A1 | 4/1979 |
| GB | 578090 A | 6/1946 |

OTHER PUBLICATIONS

Office Action dated Dec. 3, 2021 in Chinese Patent Application No. 201980050315.8 (with English translation), 15 pages.

* cited by examiner

TURBOCHARGER ASSEMBLY

The present invention relates to an improved turbocharger assembly.

Nowadays engines provided with turbocharger assemblies are becoming increasingly common. The use of turbocharger assemblies is now usual in diesel engines both for sea and land propulsion, as it allows the efficiency of the engine to be increased, obtaining higher performance, power and energy efficiency, hence lower consumptions. However, this type of supercharging has also recently become more common in land propulsion with alternative petrol engines, in which the principle of "downsizing" is establishing. This means that smaller but turbocharged engines are used, which allow the same performance to be obtained as would be provided by larger engines.

Starting from first generation, fixed geometry turbochargers which are still current for cheaper applications and for which maximum performance is not required, in the natural progression of technical evolution, Variable-Geometry Turbochargers ("VGT") have become increasingly common and perfected, which allow operating geometries to be optimized based on engine rotation speeds, recovering as much energy as possible from the hot exhaust gases coming from the cylinders and transferring it to the turbocharger.

Precisely because they work with exhaust gases, all the turbines of the turbocharger assemblies need to be cooled down, often with air, as it happens for outdoor installations, but in the case of installations in closed environments, such as in the case of marine installations in which the engines are installed in a "machine room" inside the hull, it is normally envisaged that the casing of the turbine comprises an interspace in which a cooling fluid circulates in a closed circuit, e.g. fresh water with additives, cooled by an exchanger or radiator.

In engines with a turbocharger assembly of the known type, flanges are provided for connecting the turbine to the engine, and in particular to the exhaust gas manifold in which in addition to the holes for the fixing studs, a central hole is provided for the passage of the exhaust combustion gases and two holes for the passage of the cooling liquid.

For example, FIG. 1 illustrates a connection flange A of the known type between a turbine of a turbocharger assembly and an exhaust gas manifold of an engine. The following are fashioned in such flange A: a central exhaust hole C, four holes B for the passage of the cooling liquid (e.g. two holes for the delivery and two holes for the return), four holes D for the fixing studs.

The connection between the turbine and the exhaust manifold of the engine, which collects in a single duct the exhaust gases coming from a plurality of cylinders, is therefore critical from the point of view of gas and liquid sealing and, therefore, is always provided with a gasket resistant to high temperatures. Such gasket is placed between the two connection flanges.

In the case in which, for any reason (e.g. incorrect assembly, defective gasket, overheating due to lack of or insufficient cooling), the gasket is burned or ruined, it is possible that the liquid of the cooling circuit enters the exhaust gas duct rising backwards until it enters the engine cylinders, therefore causing very severe damage.

There is also another cause of water entering the engine cylinders which exclusively affects engines for marine applications, due to the rising of sea water through the exhaust gas duct.

In fact, in marine applications exhaust gases are mixed with sea water coming from the open engine cooling circuit (the one which, through a water-water exchanger, cools the fresh water with additives of the closed cooling circuit), to reduce their temperature and prevent any corrosion effects on the exhaust ducts, and discharged into the sea either directly or through exhaust ducts, in order to reduce noise.

In the case of planing boats the flow is located in areas of the hull that are below the floating line in displacement conditions or with the boat stationary and for this reason they are usually provided with alternative exhausts into the air.

Despite the possibility to introduce safety systems (e.g. goosenecks) to reduce the risk of water rising in static conditions (wave effect) the risk remains that the water rises to the extent that it penetrates into the engine cylinders.

A safety system that is adopted for reducing these dangers is the insertion into the exhaust duct of a shut-off valve (known as a "clapet"). When the exhaust flow is present, the valve is raised leaving the flow free towards the outlet whereas when, especially with the boat stationary, the water rises in the opposite direction due to the effect of the wave motion, the valve closes due to the movement of the water itself.

However, the operation of this system is not completely safe as the duct does not close perfectly, for example due to the inclination of the exhaust duct.

The primary task of the present invention is to provide an improved turbocharger assembly that solves the technical problems disclosed above, obviates the drawbacks and overcomes the restrictions of the prior art allowing damage to the engine to be prevented.

Within the scope of this task, an object of the present invention is to provide an improved turbocharger assembly that prevents the inlet of cooling fluid of the cooling circuit into the exhaust gas duct and into the engine.

Another object of the invention is to provide an improved turbocharger assembly in which it is possible to fix the clapet valve so that it is functional in many positions, in particular four positions, in which the turbocharger assembly itself can be installed on an engine. The constraint for the positioning of the turbocharger assembly is that the axis of the turbine assembly must be horizontal. In fact, a turbocharger assembly is not necessarily designed and realized specifically for one engine but, instead, in general it is built so that it can be installed on different engines made by different manufacturers.

Another object of the invention is to provide an improved turbocharger assembly that prevents the inlet of sea water into the turbine and therefore into the exhaust gas duct and into the engine.

A further object of the invention is to provide an improved turbocharger assembly that is capable of providing the broadest guarantees of reliability and safety when used.

Another object of the invention is to provide an improved turbocharger assembly that is easy to make and is economically competitive when compared with the prior art.

The task disclosed above, as well as the objects mentioned and others which will become more apparent as follows, are achieved by an improved turbocharger assembly as described in claim 1.

Further characteristics are set out in the dependent claims.

Further features and advantages shall result more apparent from the description of a preferred, but not exclusive, embodiment of an improved turbocharger assembly, illustrated merely by way of non-limiting example with the aid of the accompanying drawings, in which.

Figure 1:
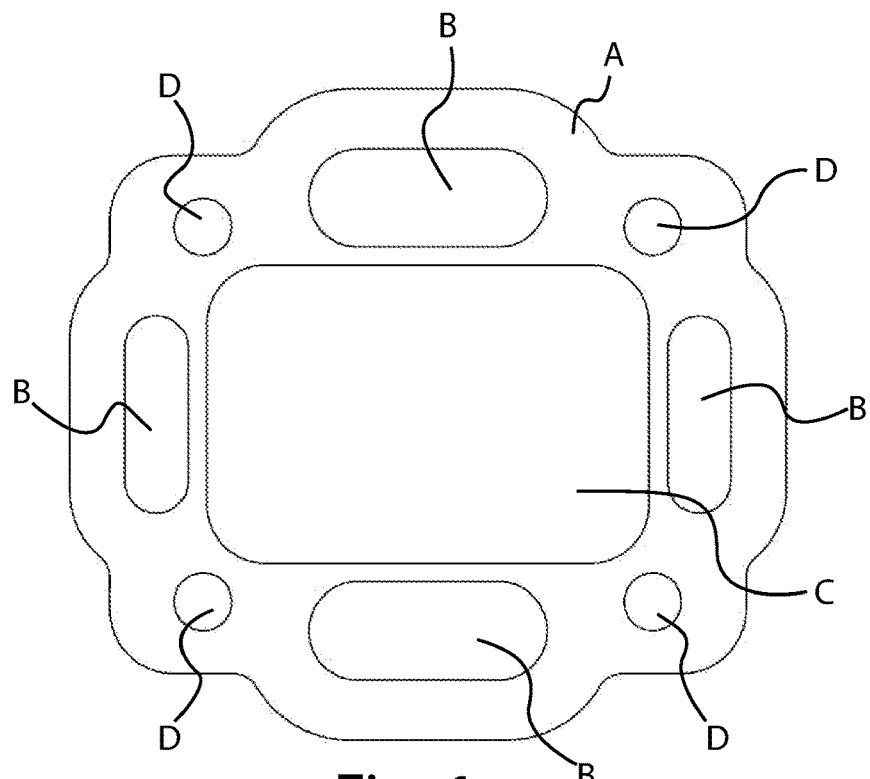
FIG. 1 is a schematic plan view of a connection flange of the known type between a turbine of a turbocharger assembly and an exhaust gas manifold of an engine.

With reference to the mentioned figures, the improved turbocharger assembly, particularly of the variable geometry type, indicated overall with reference number 1, comprises a turbine 3, which comprises an impeller 5 housed in a casing 7. The turbine 3 further comprises a flange 9 which can be sealingly associated to a corresponding flange 11 of an exhaust gas manifold 10 of an engine 12.

According to the invention, the turbine 3 comprises a clapet valve 21 in turn comprising a frame 21b and a shutter element 21a hinged to said frame 21b at a hinge axis A, a housing seat 23 for said clapet valve 21 being defined within said frame, said frame 21b being made in one piece with the casing 7 of the turbine 3.

The housing seat 23 is preferably configured so as to allow the orientation of the clapet valve 21, and in particular of the shutter element 21a with respect to the casing 7 of the turbine 3 according to a plurality of positions, in particular preferably according to four different positions rotated 90° with respect to each other.

In fact, more in particular, and with particular reference to FIGS. 4 to 6D, the housing seat 23 advantageously comprises a plurality of recesses 23a, 23b, 23c and 23d, preferably four, each of said recesses being suitable to accommodate the hinge axis, respectively named A, B, C and D, for illustrative purposes, of said shutter element 21a of said clapet valve 21. Said housing seats 23, advantageously completely identical to each other, allow a single type of valve rotation pin (not shown) and a single type of valve 21 to be used.

Advantageously, the clapet valve 21 rotation pin can be realized in known ways, e.g. using a hex socket head cap screw, locked by a self-locking nut, whose seat will be perforated directly in the melting of the casing of the turbocharger assembly, through mechanical processing which is adapted to the type of installation envisaged.

With particular reference to FIGS. 6A to 6D, which show four different installation modes of the turbocharger 1 with respect to the engine assembly 12, it is noted how, thanks to the specific configuration of the housing seat 23 of said clapet valve 21, and in particular thanks to the presence of the four recesses 23a, 23b, 23c and 23d, each suitable to house the hinge axis A of said shutter element 21a, the latter can always be positioned, regardless of the positioning of the turbocharger, with the hinge axis A placed above the body of said shutter element 21a, i.e. with particular reference to FIGS. 4, 5 and 6A to 6D, so that the force of gravity exerts on the shutter element 21a with respect to the hinge axis A a suitable moment to close said shutter element 21a on said frame 21b.

Advantageously, the turbocharger assembly 1 comprises a liquid cooling circuit fashioned in the casing 7 of the turbine 3. Such liquid cooling circuit of the turbine 3 comprises inlet/outlet ducts 13, 15 for said cooling liquid that can be sealingly associated with corresponding inlet/outlet ducts 17, 19 of a liquid cooling circuit of said engine. The inlet/outlet ducts 13, 15 of the liquid cooling circuit of the turbine 3 are physically separated from the flange 9 of the turbine 3.

Figure 2:
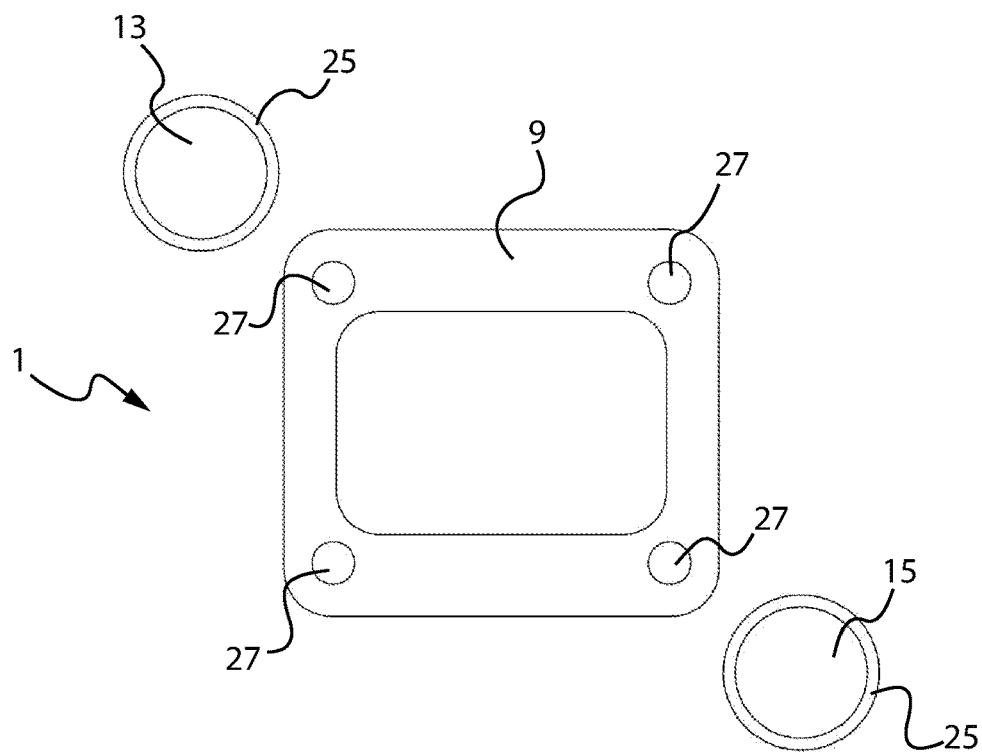
FIG. 2 is a schematic plan view of a connection flange of an improved turbocharger assembly, according to the invention.
Figure 3:
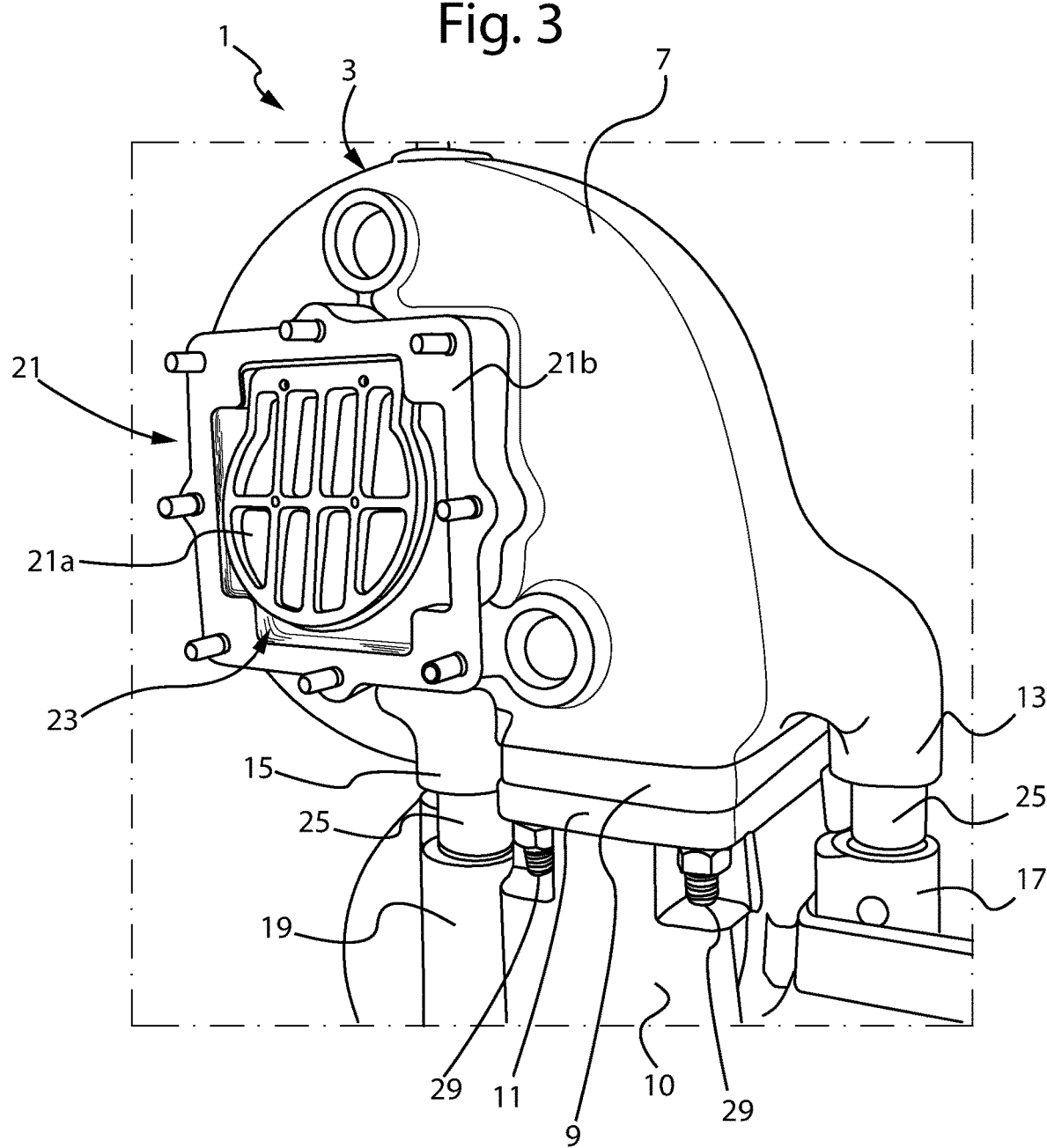
FIG. 3 is a perspective view of a turbine of an improved turbocharger assembly, according to the invention.
Figure 4:
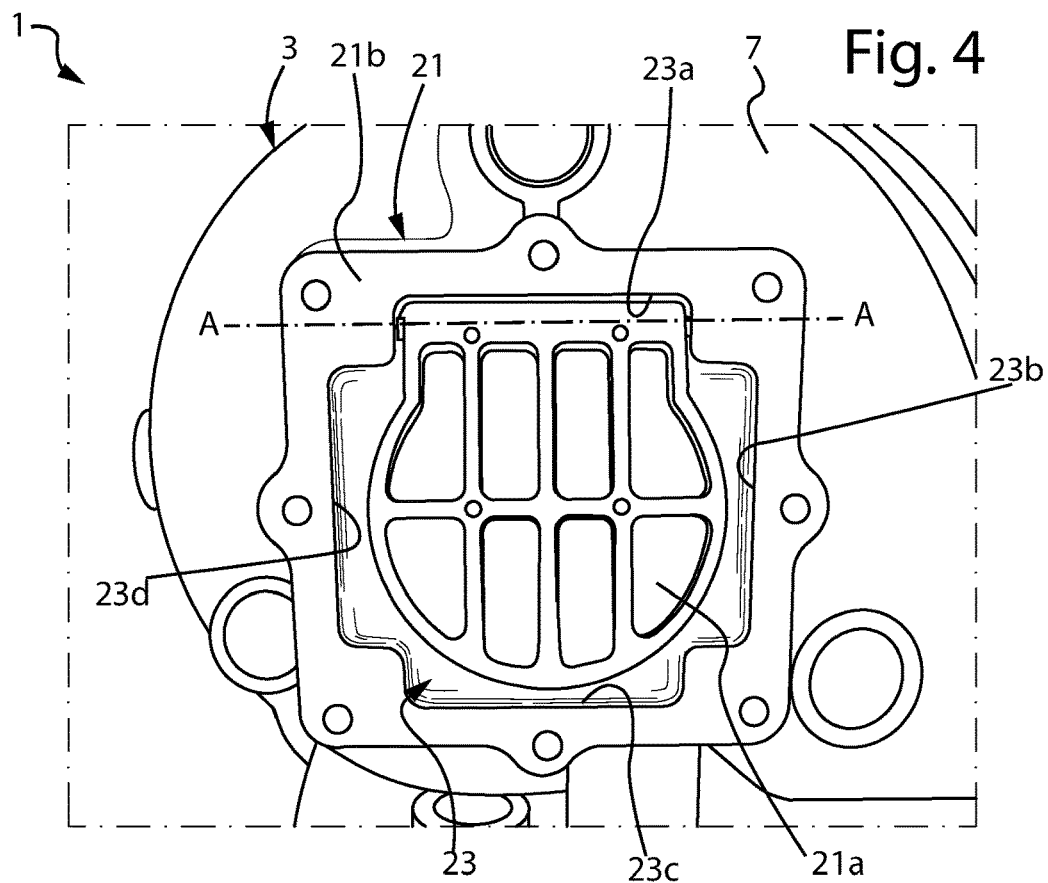
FIG. 4 is a front view of the turbine of FIG. 3, with the clapet valve closed, in which it is possible to observe the four different seats, at 90° to each other, for the installation of the valve, with the respective rotation pin, of which the paths of the axes are shown.
Figure 4A:
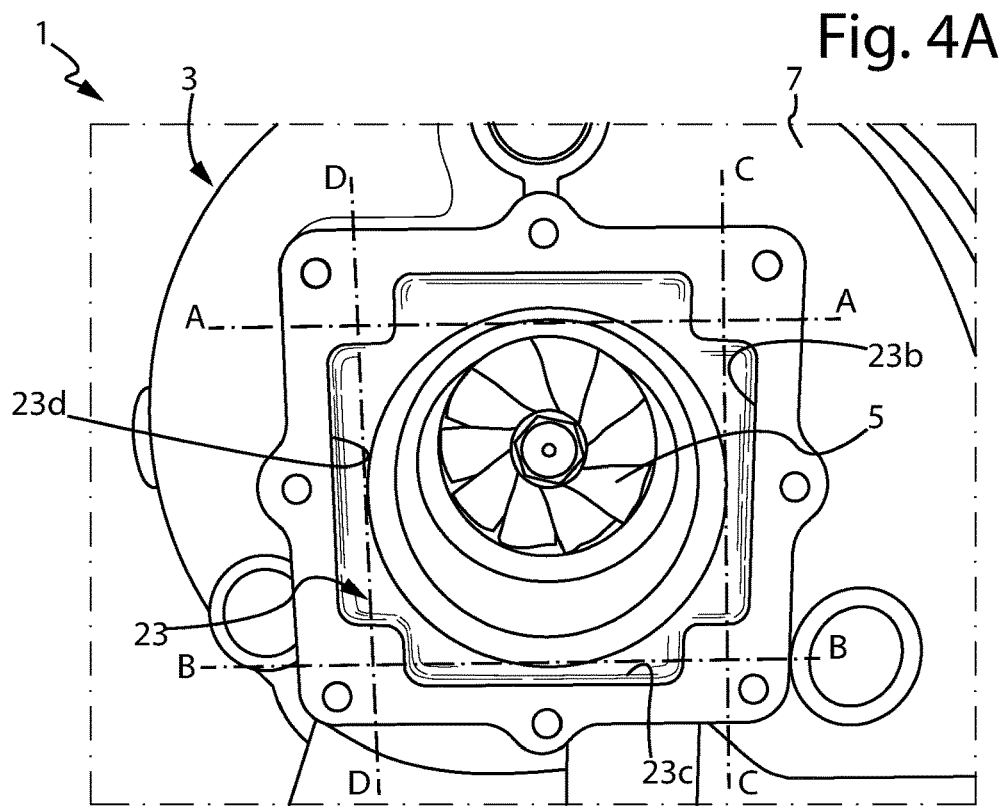
FIG. 4A illustrates the same view as FIG. 4 in which the shutter element has been removed and the possible positions of the hinge axes have been illustrated.
Figure 5:
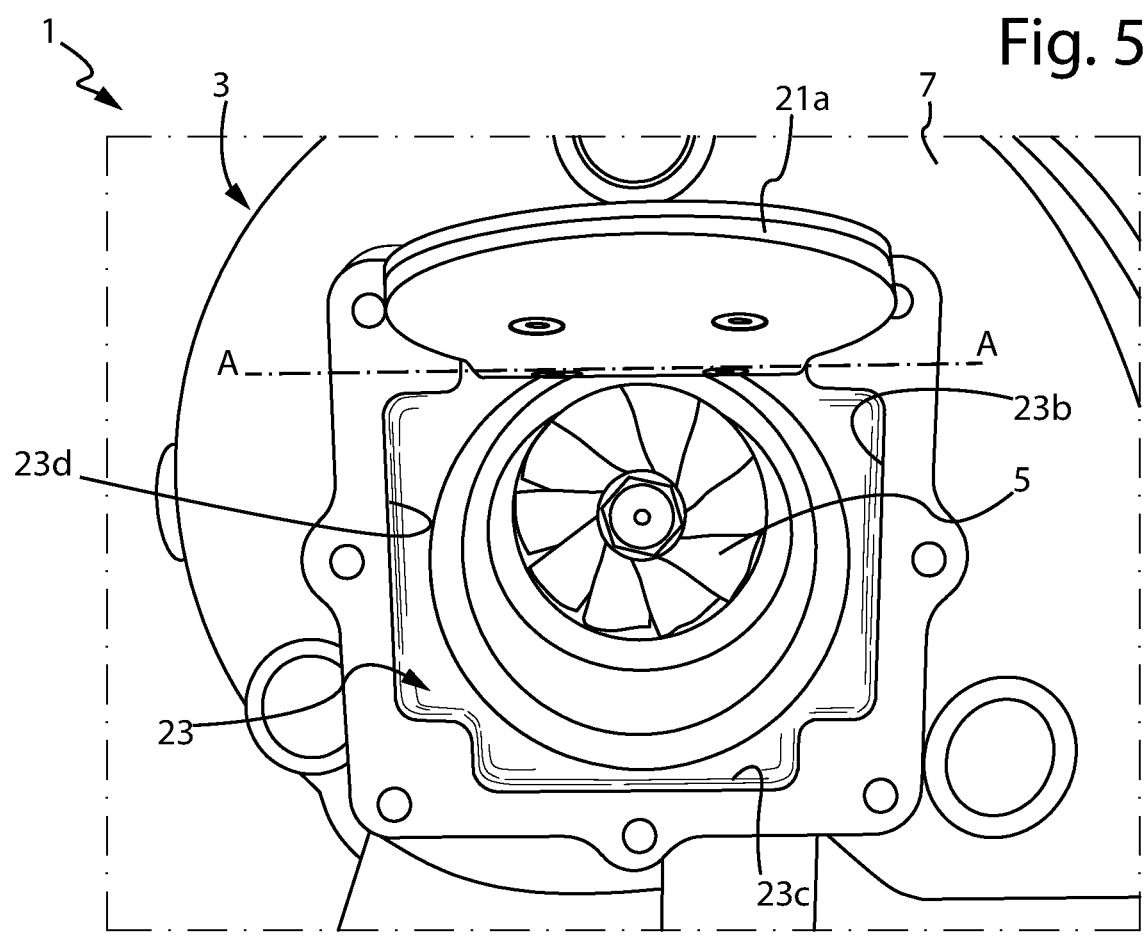
FIG. 5 is a front view of the turbine of FIG. 3, with the clapet valve open.
Figure 6A:
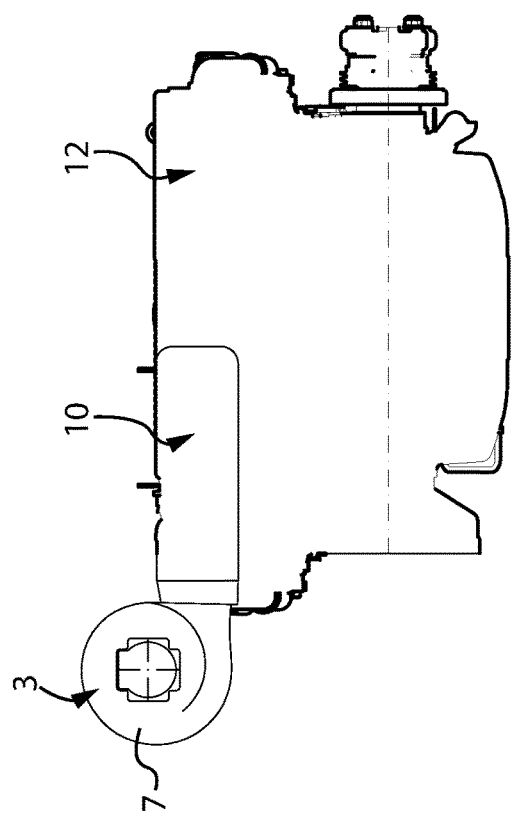
FIGS. 6A-6D show, by way of example, four different possible installation methods on an engine of the turbocharger assembly.
Figure 6B:
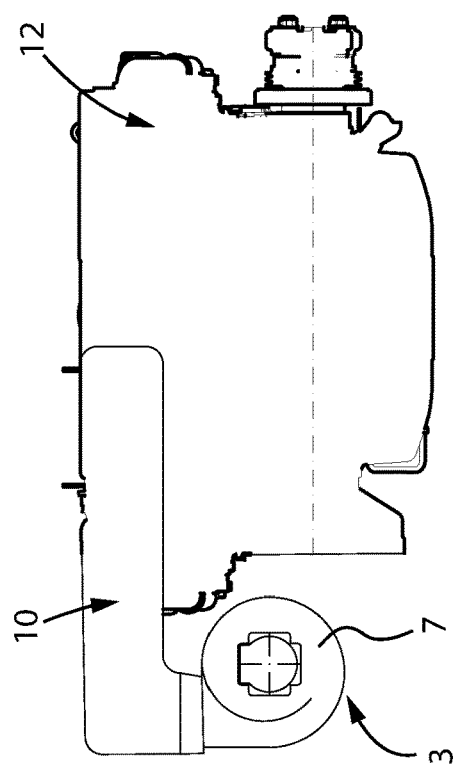
Figure 6C:
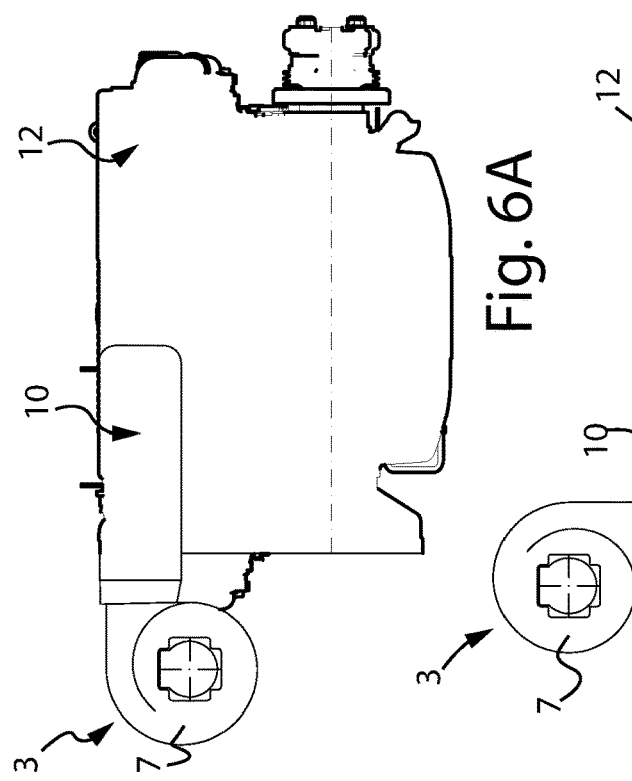
Figure 6D:
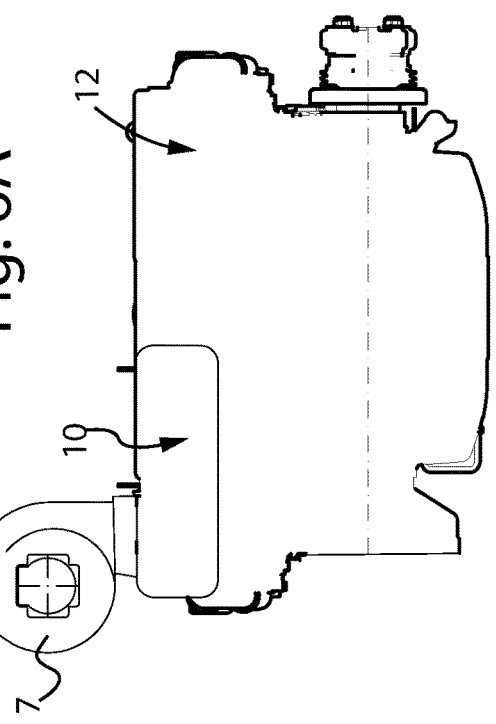

In fact, as illustrated in FIG. 2 and in FIG. 3, the inlet/outlet ducts 13, 15 of the cooling circuit do not cross the connection flange 9 of the turbine 3, but are completely external thereto.

Advantageously, the improved turbocharger assembly 1 comprises a plurality of sleeves 25 for sealingly connecting the inlet/outlet ducts 13, 15 of the liquid cooling circuit of the turbine 3 with the inlet/outlet ducts 17, 19 of the liquid cooling circuit of the engine.

Advantageously the casing 7 of the turbine 3 is obtained by melting of a metallic material. The housing seat 23 of the clapet valve 21 is also fashioned by melting said metallic material.

Furthermore, the improved turbocharger assembly 1 can comprise a sealing gasket between the flange 9 of the turbine 3 and the corresponding flange 11 of the exhaust gas manifold 10 of the engine.

Such flange 9 of the turbine 3 advantageously comprises a plurality of holes 27 for fixing studs 29, adapted to allow the fixing of the flange 9 itself to the corresponding flange 11 on the engine side.

The clapet valve 21 is preferably made of titanium or steel, or other materials that are resistant to the high operating temperatures (even over 800° C.)

The fact that the impeller 5 of the turbine 3 is mounted in a casing 7 with inlet/outlet ducts 13, 15 of the cooling liquid connected to the cooling circuit, not directly through flanging but through connection sleeves 25 (also called "ossi"), allows the cooling liquid circuit to be completely separated from the exhaust gas ducts. In this way, the flanging, with related sealing gasket, will only regard the hot exhaust gas duct, eliminating at the root any possible risk of cooling liquid seeping into the duct itself and therefore into the engine.

The fact of incorporating the "clapet" valve 21 into the casing 7 of the turbine 3, fashioning the seat 23 directly in the melting thereof allows the operation of the aforesaid valve to be made more effective and safe. The mobile element of the clapet valve 21, which can also be made of various parts joined together, is also shaped so as to completely close the exhaust duct of the turbine 3, when resting, whereas it is raised due to the thrust effect of the gases, guaranteeing the correct outlet thereof. Advantageously, the mobile clapet element 21 and the exhaust duct of the turbine 3, so-called "riser" (not illustrated in the appended figures), in which the mixing with the water of the open cooling circuit takes place, are designed so as to allow the raising of the mobile element of the clapet valve 21 inside the riser duct, without reducing the useful flow section.

Advantageously the improved turbocharger assembly can be used both on mono-turbo engines and on bi-turbo engines.

It has in practice been noted how the improved turbocharger assembly fulfils the intended task as well as the predefined aims as it allows damage to the engine to be prevented, due, for example, to the seepage of cooling liquid into the exhaust gas duct, or the entry of sea water into the turbine and therefore into the exhaust gas duct.

The improved turbocharger assembly as conceived herein is susceptible to many modifications and variations, all falling within the scope of the invented concept; furthermore, all the details are replaceable by technically equivalent elements. In practice, the materials used, as well as the dimensions, can be of any type according to the technical requirements.

In practice, any materials can be used according to requirements, as long as they are compatible with the specific use, the dimensions and the contingent shapes.

The invention claimed is:

1. A turbocharger assembly, comprising a turbine comprising an impeller, a flange, and a passive clapet valve, wherein
said impeller is housed in a casing,
said flange is sealingly associated with a corresponding flange of an exhaust gas manifold of an engine, and
said clapet valve contains a frame and a shutter element hinged to said frame at a hinge axis, wherein said frame defines a receiving seat for said shutter element and is made in one piece with said casing and wherein said clapet valve is arranged downstream of said impeller flow.

2. The turbocharger assembly according to claim 1, wherein said receiving seat of said shutter element is configured so as to allow an assembly of said shutter element with respect to said frame according to a plurality of different positions.

3. The turbocharger assembly according to claim 2, wherein said receiving seat of said shutter element is configured so as to allow the assembly of said shutter element with respect to said frame according to at least four different positions rotated by 90° with respect to each other.

4. The turbocharger assembly according to claim 3, wherein said receiving seat of said shutter element comprises at least four recesses, each of said recesses being suitable to receive the hinge axis of said shutter element.

5. The turbocharger assembly according to claim 1, further comprising a liquid cooling circuit obtained inside said casing of said turbine, wherein said liquid cooling circuit comprises inlet/outlet ducts for cooling liquid that are sealingly associated with corresponding inlet/outlet ducts of a liquid cooling circuit of said engine, and said inlet/outlet ducts of said liquid cooling circuit of said turbine are physically separated from said flange of said turbine.

6. The turbocharger assembly according to claim 5, further comprising a plurality of sleeves for sealingly connecting said inlet/outlet ducts of said liquid cooling circuit of said turbine with said corresponding inlet/outlet ducts of said liquid cooling circuit of said engine.

7. The turbocharger assembly according to claim 1, wherein said casing of said turbine is obtained by melting a metal material, and said receiving seat of said clapet valve is also obtained by melting said metal material.

8. The turbocharger assembly according to claim 1, further comprising a sealing gasket between said flange of said turbine and said corresponding flange of said exhaust gas manifold of said engine.

9. The turbocharger assembly according to claim 1, wherein said flange of said turbine comprises a plurality of holes for fixing studs.

10. The turbocharger assembly according to claim 1, wherein said clapet valve is made of titanium or steel.

11. A turbocharger assembly, comprising a turbine comprising an impeller, a flange, and a clapet valve, wherein
said impeller is housed in a casing,
said flange is sealingly associated with a corresponding flange of an exhaust gas manifold of an engine, and
said clapet valve contains a frame and a shutter element hinged to said frame at a hinge axis, wherein said frame defines a receiving seat for said shutter element and is made in one piece with said casing and wherein said receiving seat of said shutter element is configured so as to allow an assembly of said shutter element with respect to said frame according to at least four different positions rotated by 90° with respect to each other.

* * * * *